United States Patent
You et al.

(10) Patent No.: US 10,763,507 B2
(45) Date of Patent: Sep. 1, 2020

(54) PRECURSOR FOR THE PRODUCTION OF POSITIVE ELECTRODE ACTIVE MATERIAL COMPRISING METAL OXIDES HAVING MULTILAYERED STRUCTURE AND POSITIVE ELECTRODE ACTIVE MATERIAL FOR LITHIUM SECONDARY BATTERY PRODUCED USING THE SAME

(71) Applicant: LG Chem, Ltd., Seoul (KR)

(72) Inventors: Min Kyu You, Daejeon (KR); Ho Suk Shin, Daejeon (KR)

(73) Assignee: LG Chem, Ltd. (KR)

( * ) Notice: Subject to any disclaimer, the term of this patent is extended or adjusted under 35 U.S.C. 154(b) by 213 days.

(21) Appl. No.: 15/752,831

(22) PCT Filed: Sep. 9, 2016

(86) PCT No.: PCT/KR2016/010220
§ 371 (c)(1),
(2) Date: Feb. 14, 2018

(87) PCT Pub. No.: WO2017/069405
PCT Pub. Date: Apr. 27, 2017

(65) Prior Publication Data
US 2018/0241040 A1   Aug. 23, 2018

(30) Foreign Application Priority Data
Oct. 22, 2015 (KR) .......................... 10-2015-0147124

(51) Int. Cl.
| H01M 4/00 | (2006.01) |
| H01M 4/58 | (2010.01) |
| H01M 4/131 | (2010.01) |
| H01M 4/505 | (2010.01) |
| H01M 4/36 | (2006.01) |
| H01M 4/525 | (2010.01) |
| H01M 2/10 | (2006.01) |
| H01M 10/052 | (2010.01) |
| C01G 53/00 | (2006.01) |
| C01G 53/04 | (2006.01) |
| C01B 25/45 | (2006.01) |
| H01M 10/0525 | (2010.01) |
| H01M 4/02 | (2006.01) |

(52) U.S. Cl.
CPC ........... H01M 4/5825 (2013.01); C01B 25/45 (2013.01); C01G 53/04 (2013.01); C01G 53/50 (2013.01); H01M 2/10 (2013.01); H01M 4/131 (2013.01); H01M 4/36 (2013.01); H01M 4/366 (2013.01); H01M 4/505 (2013.01); H01M 4/525 (2013.01); H01M 10/052 (2013.01); H01M 10/0525 (2013.01); *C01P 2004/84* (2013.01); *C01P 2006/11* (2013.01); *C01P 2006/40* (2013.01); *H01M 2004/028* (2013.01)

(58) Field of Classification Search
CPC ...... H01M 4/5825; H01M 4/131; H01M 4/36; H01M 4/366; H01M 4/505; H01M 4/525; H01M 2/10; H01M 2004/028; H01M 10/052; H01M 10/0525
See application file for complete search history.

(56) References Cited

U.S. PATENT DOCUMENTS

| 8,268,198 B2 | 9/2012 | Shin et al. | |
| 2009/0068561 A1 | 3/2009 | Sun et al. | |
| 2009/0272939 A1 | 11/2009 | Sun et al. | |
| 2012/0043499 A1 | 2/2012 | Shin et al. | |
| 2013/0202966 A1* | 8/2013 | Yu ......................... | H01M 4/131 429/223 |
| 2014/0346393 A1* | 11/2014 | Park ...................... | H01M 4/131 252/182.1 |
| 2015/0104708 A1 | 4/2015 | Bi et al. | |
| 2015/0228975 A1 | 8/2015 | Lee et al. | |
| 2016/0164087 A1 | 6/2016 | Park et al. | |

FOREIGN PATENT DOCUMENTS

| CN | 103515606 A | 1/2014 |
| CN | 103531777 A | 1/2014 |
| CN | 104106159 A | 10/2014 |
| EP | 2802030 A1 | 11/2014 |
| JP | 2009525578 A | 7/2009 |
| JP | 2010511990 A | 4/2010 |
| JP | 2011516384 A | 5/2011 |
| KR | 20060134631 A | 12/2006 |
| KR | 1020060130964 A | 12/2006 |
| KR | 100744759 B1 | 7/2007 |
| KR | 20110083383 A | 7/2011 |
| KR | 20150014892 A | 2/2015 |
| KR | 20150021417 A | 3/2015 |
| KR | 20150037437 A | 4/2015 |
| KR | 20150037635 A | 4/2015 |
| KR | 20150045784 A | 4/2015 |
| WO | 2008069351 A1 | 6/2008 |

OTHER PUBLICATIONS

International Search Report for Application No. PCT/KR2016/010220 dated Dec. 19, 2016.

(Continued)

*Primary Examiner* — Jane J Rhee
(74) *Attorney, Agent, or Firm* — Lerner, David, Littenberg, Krumholz & Mentlik, LLP

(57) ABSTRACT

The present invention provides a precursor for the production of a positive electrode active material for a secondary battery comprising: a core composed of transition metal hydroxides including nickel(Ni) and manganese(Mn) and further including anions other than hydroxyl groups(OH), or transition metal hydroxides including nickel(Ni), manganese(Mn) and cobalt(Co) and further including anions other than hydroxyl groups(OH); and a shell composed of transition metal hydroxides including cobalt(Co) and further including anions other than hydroxyl groups(OH), and a positive electrode active material for lithium secondary battery produced using the same.

15 Claims, No Drawings

(56) References Cited

OTHER PUBLICATIONS

Extended European Search Report including Written Opinion for EP 16857663 dated Jun. 4, 2018.
Lee, K.S. et al., "Synthesis and electrochemical performances of core-shell structured Li[(Ni1/3Co1/3Mn1/3)0.8 (Ni1/2Mn1/2)0.2]O2 cathode material for lithium ion batteries," Journal of Power Sources, vol. 195, No. 18, Sep. 15, 2010, pp. 6043-6048, XP027148140.
Yang-Kook Sun et al., "Effect of Mn Content in Surface on the Electrochemical Properities of Core-Shell Structured Cathode Materials," Journal of the Electrochemical Society, vol. 159, No. 1, Jan. 1, 2012, p. A1, XP055476917.
Chinese Search Report for Application No. 201680048054.2, dated Jun. 9, 2020, pp. 1-2.

* cited by examiner

PRECURSOR FOR THE PRODUCTION OF POSITIVE ELECTRODE ACTIVE MATERIAL COMPRISING METAL OXIDES HAVING MULTILAYERED STRUCTURE AND POSITIVE ELECTRODE ACTIVE MATERIAL FOR LITHIUM SECONDARY BATTERY PRODUCED USING THE SAME

CROSS-REFERENCE TO RELATED APPLICATIONS

The present application is a national phase entry under 35 U.S.C. § 371 of International Application No. PCT/KR2016/010220 filed Sep. 9, 2016, published in Korean, which claims priority from Korean Patent Application No. 10-2015-0147124 filed on Oct. 22, 2015, all of which are incorporated herein by reference.

TECHNICAL FIELD

This application claims priority to and the benefit of Korean Patent Application No. 10-2015-0147124 filed on Oct. 22, 2015 with the Korean Intellectual Property Office, the disclosure of which is incorporated herein by reference in its entirety.

The present invention relates to a precursor for the production of a positive electrode active material comprising metal oxides having a multilayered structure, and a positive electrode active material for lithium secondary battery produced using the same.

BACKGROUND OF ART

Due to the rapid increase in the use of fossil fuels, the demand for the use of alternative energy and clean energy is increasing, and in a bid to meet the demand, the fields of electric power generation and electric energy storage using electric chemistry are most actively studied.

As a representative example of electrochemical devices using electrochemical energy, secondary batteries are currently used and application thereof is gradually expanding.

Recently, as technology for portable devices, such as portable computers, portable phones, cameras, and the like, continues to develop and demand therefor continues to increase, demand for secondary batteries as energy sources is rapidly increasing. Among these secondary batteries, research on lithium secondary batteries having high energy density, high operating potential, long cycle lifespan and low self-discharge rate has been underway and such lithium secondary batteries are commercially available and widely used.

As the lithium secondary battery, lithium-containing cobalt oxide ($LiCoO_2$) is mainly used, and in addition, the use of lithium-containing manganese oxide such as $LiMnO_2$ having a layered crystal structure and $LiMn_2O_4$ having a spinel crystal structure and lithium-containing nickel oxide ($LiNiO_2$) is also considered.

As the positive electrode active material of a lithium secondary battery, lithium-containing cobalt oxide ($LiCoO_2$) is mainly used, and in addition, the use of lithium-containing manganese oxide such as $LiMnO_2$ having a layered crystal structure and $LiMn_2O_4$ having a spinel crystal structure and lithium-containing nickel oxide ($LiNiO_2$) is also considered.

Among the above-mentioned positive electrode active materials, $LiCoO_2$ has excellent lifespan characteristics and charge/discharge efficiency and thus is most frequently used, but it has disadvantages that high temperature safety is lowered, and cobalt used as a raw material is expensive due to its resource restriction and thus there is a limit in price competition aspect.

Lithium manganese oxides such as $LiMnO_2$ and $LiMn_2O_4$ are advantageous in that they are excellent in thermal stability, and they are inexpensive and easy to synthesize, but there are problems that the capacity is small, the high temperature characteristics are poor, and the conductivity is low.

In addition, $LiNiO_2$-based positive electrode active material is relatively inexpensive and shows battery characteristics such as high discharging capacity, but exhibits sudden phase transition of the crystal structure in accordance with volume change accompanying charge/discharge cycles. Further, there is a problem that the stability is abruptly lowered when exposed to air and moisture.

Therefore, recently, a lithium transition metal oxide in which a part of nickel is substituted with another transition metal such as manganese or cobalt has been proposed as an alternative material. However, such metal-substituted nickel-based lithium-transition metal oxides have an advantage in that they have relatively excellent cycle characteristics and capacity characteristics. However, even in this case, the cycle characteristics are drastically lowered when used for a long period of time, and problems such as swelling due to gas generation of the battery and deterioration of thermal stability due to low chemical stability are not sufficiently solved.

Therefore, there is a high need for a positive electrode active material capable of solving the thermal stability problem even while exhibiting improved capacity and output characteristics.

DETAILED DESCRIPTION OF THE INVENTION

Technical Problem

The present invention in some embodiments seeks to resolve the above-described deficiencies of the prior art and the technical issues long outstanding in the art.

As a result of a variety of extensive and intensive studies and experiments to solve the problems as described above, the present inventors have found that, as described later, when the precursor for producing the positive electrode active material for a secondary battery is formed in a structure including a core composed of transition metal hydroxides including nickel(Ni) and manganese(Mn) and further including anions other than hydroxyl groups(OH), or transition metal hydroxides including nickel(Ni), manganese(Mn) and cobalt(Co) and further including anions other than hydroxyl groups(OH), and a shell composed of transition metal hydroxides including cobalt(Co) and further including anions other than hydroxyl groups(OH), the positive electrode active material having improved density of the precursor as compared with the case of not containing anions, and having a structure including a core composed of nickel-rich transition metal oxides and a shell composed of cobalt-rich lithium transition metal oxides can be produced, and thus such positive electrode active material can exert only merits of the compounds of each of the core and the shell and thus can maintain the thermal stability while exhibiting high capacity and excellent high output characteristics, thereby completing the present invention.

Technical Solution

In order to achieve the above objects, a precursor for the production of a positive electrode active material for a secondary battery according to the present invention comprises:

a core composed of transition metal hydroxides including nickel(Ni) and manganese(Mn) and further including anions other than hydroxyl groups(OH), or transition metal hydroxides including nickel(Ni), manganese(Mn) and cobalt(Co) and further including anions other than hydroxyl groups (OH); and a shell composed of transition metal hydroxides including cobalt(Co) and further including anions other than hydroxyl groups(OH).

Generally, in the process of charging and discharging, the crystal structure is irreversibly changed due to a decrease in the structural stability of the positive electrode active material, and side reactions occur in which the elution of transition metal and the release of oxygen occur simultaneously. In particular, the nickel-rich lithium transition metal oxides have relatively low structural stability but are relatively superior in capacity and resistance/output characteristics. In addition, the cobalt-rich lithium transition metal oxide is excellent in lifespan characteristics and charge/discharge efficiency and exhibits excellent high power output characteristics, but it has a disadvantage that its high-temperature safety is deteriorated.

In addition, as the particle density of the precursor increases, particles can be formed in a dense and stable structure. When the positive electrode active material is produced using such precursor, the production yield of the positive electrode active material is increased and the lifespan characteristics of the battery can be improved.

Therefore, the precursor for the production of the positive electrode active material for a secondary battery according to the present invention is formed in a structure including a core composed of transition metal hydroxides including nickel(Ni) and manganese(Mn) and further including anions other than hydroxyl groups(OH), or transition metal hydroxides including nickel(Ni), manganese(Mn) and cobalt(Co) and further including anions other than hydroxyl groups (OH), and a shell composed of transition metal hydroxides including cobalt(Co) and further including anions other than hydroxyl groups(OH), thereby producing a positive electrode active material having improved density of the precursor as compared with the case of not containing anions, and having a structure including a core composed of nickel-rich transition metal oxides and a shell composed of cobalt-rich lithium transition metal oxides, and thus such positive electrode active material can exert only merits of the compounds of each of the core and the shell and have a structural stability while exhibiting excellent high output characteristics, thereby improving the lifespan characteristics and increasing the production yield of the active material.

In one specific embodiment, in order to enhance the structural stability of the positive electrode active material produced using the above precursor, at least one or more of the transition metals in the transition metal hydroxides can substituted with one or more metals having a valence of +2 or +3 within a predetermined amount range, and more specifically, the transition metal hydroxide of the core and the transition metal hydroxide of the shell may further include one or more doping elements which are in each case mutually independently selected from the group consisting of tungsten(W), boron(B), aluminum(Al), zirconium(Zr), titanium(Ti), magnesium(Mg), chromium(Cr), and silicon (Si).

Also, the transition metal hydroxide of the core and the transition metal hydroxide of the shell has a form in which some hydroxyl groups(OH) may be substituted with anions (A,A') having a valence of −1 to −3, and the anions may be, for example, one or more selected from the group consisting of $PO_4$, $BO_2$, $B_4O_7$, $B_3O_5$ and F.

Because of substitution by these anions, bonding to transition metals may be improved, the density of the precursor may be increased, and the structural transition of the positive electrode active material may be prevented, thereby increasing battery life. On the other hand, if the substitution amount of anions is too large (0.5 molar ratio or more relative to total moles of anions), it is not preferable because the compound cannot maintain a stable structure, resulting in deterioration in lifetime characteristics. Therefore, the substitution amount of anions is preferably 0.01 to 0.5 molar ratio relative to total moles of anions.

Specifically, the transition metal hydroxide of the core may be a compound represented by the following Formula 1, and the transition metal hydroxide of the shell may be a compound represented by the following Formula 2.

$$Ni_aMn_bCo_{1-(a+b+c)}M_c[(OH_{1-x})_{2-(z/n)}A_{(z/n)}] \quad (1)$$

wherein, $0.55 \leq a \leq 0.9$, $0.05 \leq b \leq 0.5$, $0 \leq c \leq 0.1$, $a+b+c \leq 1$, $0 < x < 0.5$, $0.01 \leq z \leq 0.5$, N is an oxidation number of A;

M is one or more selected from the group consisting of W, B, Al, Zr, Ti, Mg, Cr, and Si; and A is one or more selected from the group consisting of $PO_4$, $BO_2$, $B_4O_7$, $B_3O_5$ and F;

$$Co_{(1-a)}Z_a[(OH_{1-x})_{2-(z/n)}A'_{(z/n)}] \quad (2)$$

wherein, $0 \leq a \leq 0.1$, $0 < x < 0.5$, $0.01 \leq z \leq 0.5$, n is an oxidation number of A';

Z is one or more selected from the group consisting of W, B, Al, Zr, Ti, Mg, Cr, and Si; and A' is one or more selected from the group consisting of $PO_4$, $BO_2$, $B_4O_7$, $B_3O_5$ and F.

The present invention also provides a method for producing the precursor for the production of the positive electrode active material.

Specifically, a method for producing a precursor for the production of a positive electrode active material comprises the steps of:

(a) preparing an transition metal aqueous solution in which a nickel salt and a manganese salt are mixed or an transition metal aqueous solution in which a nickel salt, a cobalt salt, and a manganese salt are mixed, and an sodium hydroxide aqueous solution, and an ammonia aqueous solution;

(b) supplying the transition metal aqueous solution and a doping agent for substituting anions for hydroxyl groups of the precursor compound, the sodium hydroxide aqueous solution and the ammonia aqueous solution into a wet-type reactor, followed by mixing and reaction to obtain a spherical precipitate in which anions are substituted for hydroxyl groups; and (c) simultaneously injecting the spherical precipitate, the aqueous solution of cobalt-based metal salt, the ammonia aqueous solution, and the sodium hydroxide aqueous solution into a wet-type reactor adjusted to have an inert atmosphere, followed by mixing and reaction to obtain a precipitate of particles having a core-shell structure.

According to one specific embodiment, in the step(c), a doping agent can be further added to the wet-type reactor such that anions are substituted for the hydroxyl group of the compound forming the shell of the precipitate.

Further, in the step (a), a salt containing a doping element for increasing structural stability is additionally prepared, and in the step(b), a salt containing a doping element, an transition metal aqueous solution, an sodium hydroxide aqueous solution and an ammonia aqueous solution are supplied into the wet-type reactor, following by mixing and reaction to obtain a spherical precipitate.

Further, in the step (c), the spherical precipitate containing the doping element, the aqueous solution of cobalt-based metal salt, the ammonia aqueous solution, and the sodium hydroxide aqueous solution are simultaneously injected into a reactor adjusted to have an inert atmosphere, following by mixing and reaction to obtain a precipitate of particles having a core-shell structure.

Specifically, the doping element may be one element or more selected from the group consisting of W, B, Al, Zr, Ti, Mg, Cr, and Si.

The present invention also provides a positive electrode active material for a lithium secondary battery produced using the precursor for the production of the positive electrode active material.

Specifically, the positive electrode active material for a lithium secondary battery comprises:

a core composed of lithium transition metal oxides including nickel(Ni) and manganese(Mn), or lithium transition metal oxides including nickel(Ni), manganese(Mn) and cobalt(Co); and a shell composed of lithium transition metal oxides including cobalt(Co).

wherein the transition metal oxides of the core and the shell have features that anions having a valence of −1 to −3 are substituted for oxygen(O), respectively.

Therefore, since the positive electrode active material for a lithium secondary battery according to the present invention is formed in a structure including a core composed of lithium transition metal oxides including nickel(Ni) and manganese(Mn), or lithium transition metal oxides including nickel(Ni), manganese(Mn) and cobalt(Co), and a shell composed of lithium transition metal oxides including cobalt(Co), the structure transition of the positive electrode active material is prevented by being formed in a structure in which oxygen is substituted by anions, which can improve battery life, supplement defects of the compounds of the core and the shell from each other and exert only merits of each compound, thereby maintaining the thermal stability while exhibiting high capacity and excellent high output characteristics.

In one specific embodiment, in order to enhance the structural stability of the positive electrode active material, at least one or more of the transition metals in the lithium transition metal oxides of the core and the shell can substituted with one or more metal having a valence of +2 or +3 within a predetermined amount range. Specifically, the lithium transition metal oxide of the core and the lithium transition metal oxide of the shell may further include one or more elements which are in each case mutually independently selected from the group consisting of tungsten(W), boron(B), aluminum(Al), zirconium(Zr), titanium(Ti), magnesium(Mg), chromium(Cr), and silicon(Si).

Specifically, the lithium transition metal oxide of the core may be a compound represented by the following Formula 3, and the lithium transition metal oxide of the shell may be a compound represented by the following Formula 4.

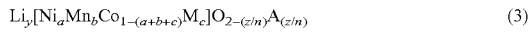   (3)

wherein,
0.55≤a≤0.9,   0.05≤b≤0.5,   0≤c≤0.1,   a+b+c≤1, 0.98≤y≤1.10, 0.01≤z≤0.5, n is an oxidation number of A;

M is one or more selected from the group consisting of W, B, Al, Zr, Ti, Mg, Cr, and Si; and A is one or more selected from the group consisting of $PO_4$, $BO_2$, $B_4O_7$, $B_3O_5$ and F;

   (4)

wherein,
0≤a≤0.1, 0.98≤y≤1.10, 0.01≤z≤0.5, n is an oxidation number of A';

Z is one or more selected from the group consisting of W, B, Al, Zr, Ti, Mg, Cr, and Si; and A' is one or more selected from the group consisting of $PO_4$, $BO_2$, $B_4O_7$, $B_3O_5$ and F.

It is desirable that the lithium transition metal oxide of Formula 3 contains a relatively large amount of Ni relative to Mn and Co, thereby maximizing the capacity. Therefore, the molar fraction(a) of Ni may be 0.55 to 0.9. On the other hand, when the content of nickel is less than 0.5, it is difficult to expect a high capacity, and when the content exceeds 0.95, there is a problem that structural stability within the cycle is extremely deteriorated.

It is desirable that the lithium transition metal oxide of Formula 4 contains a relatively large amount of Co, thereby improving high output characteristics. Therefore, the molar fraction (1−a) of Co may be 0.9 to 1.0.

In one specific example, an inorganic material layer may be additionally formed by coating on the surface of the shell. Specifically, the inorganic material layer may include one or more inorganic element selected from the group consisting of Al, Ti, Zr, W, Mg, Co, B and Nb.

In addition, the content of the inorganic material layer may be 0.1 wt % or more to 3.0 wt % or less based on the total weight of the positive electrode active material.

Meanwhile, the content ratio between the core and the shell may be from 20:80 to 80:20, more specifically from 40:60 to 60:40 on a weight basis.

In addition, the present invention can provide a method for producing a positive electrode active material for a lithium secondary battery.

Specifically, the method for producing the positive electrode active material for a lithium secondary battery may include the steps of:

(a) uniformly mixing the precursor for the production of a positive electrode active material with lithium oxide, and then performing a calcination reaction to produce a lithium transition metal oxide powder.

Here, the lithium oxide may be lithium carbonate ($Li_2CO_3$) and/or lithium hydroxide (LiOH).

In addition, the above production method may comprise the steps of:

(b) preparing a mixed solution containing one or more inorganic element selected from the group consisting of Al, Ti, Zr, W, Mg, Co, B and Nb in an organic solvent;

(c) mixing the mixed solution with the prepared lithium transition metal oxide powder and stirring the mixed solution in a paste state;

(d) drying the pasty mixture to evaporate the organic solvent; and (e) heat-treating the dried mixture to produce a positive electrode active material in which a mineral layer is formed on the surface of the lithium transition metal oxide particles.

Further, the present invention provides a positive electrode including the positive electrode active material, and provides a lithium secondary battery including the positive electrode.

On the other hand, the lithium secondary battery is generally composed of the positive electrode, a negative electrode, a separator, and a lithium salt-containing non-aqueous electrolyte.

The positive electrode is produced, for example, by coating a slurry of a mixture of the positive electrode active material according to the present invention, a conductive material and a binder onto a positive electrode current collector, and then drying the result, and if necessary, the mixture (electrode mixture) of the positive electrode active material, a conductive material, a binder and the like may further include at least one material selected from the group consisting of a viscosity controlling agent and a filler.

The positive electrode current collector is generally produced to have a thickness of 3 to 500 µm. The positive electrode current collector is not particularly limited as long as it has high conductivity without inducing chemical change in the battery, and examples thereof include stainless steel, aluminum, nickel, titanium, calcined carbon; or aluminum; or aluminum or stainless steel surface-treated with carbon, nickel, titanium, silver or the like. The current collector can form fine unevenesss on its surface to increase the adhesive force of the positive electrode active material and can take various forms such as a film, a sheet, a foil, a net, a porous body, a foam, a nonwoven fabric and the like.

The conductive material is a component for further improving the conductivity of the electrode active material, and can be added in an amount of 0.01 to 30% by weight based on the total weight of the electrode mixture. Such a conductive material is not particularly limited as long as it has a conductivity without inducing chemical change in the battery, and examples thereof include graphite such as natural graphite and artificial graphite; carbon black such as carbon black, acetylene black, ketjen black, channel black, furnace black, lamp black, and summer black; carbon fiber such as carbon nanotube and fullerene; conductive fiber such as carbon fiber and metal fiber; metal powders such as carbon fluoride, aluminum, and nickel powder; conductive whiskey such as zinc oxide and potassium titanate; conductive metal oxides such as titanium oxide; conductive materials such as polyphenylene derivatives; and the like.

The binder is a component that assists in bonding between an active material and a conductive material and in binding with a current collector. The binder may be typically added in an amount of 1 to 50% by weight based on the total weight of a mixture containing a positive electrode active material. Examples of such binders include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, a styrene-butadiene rubber, a fluorine rubber, various copolymers, and the like.

The viscosity controlling agent is a component for controlling the viscosity of an electrode mixture so as to facilitate a mixing process of an electrode mixture and a process of coating the same onto a current collector, and may be added in an amount of up to 30 wt % based on the total weight of the electrode mixture. Examples of such a viscosity controlling agent include carboxymethylcellulose, polyvinylidene fluoride, and the like, but is not limited thereto. In some cases, the solvents described above may also function as the viscosity controlling agent.

The filler is optionally used as an auxiliary component for suppressing the expansion of the positive electrode, and is not particularly limited as long as it is a fibrous material without inducing chemical change in the battery. Examples of the filler include olefin-based polymers such as polyethylene and polypropylene; fibrous materials such as glass fibers and carbon fibers are used.

The negative electrode may be produced by coating a negative electrode material onto a negative electrode current collector and drying the result, and if necessary, components such as a conductive material, a binder and the like as described above may also be further included. The negative electrode current collector is generally produced to have a thickness of 3 to 500 µm. The positive electrode current collector is not particularly limited as long as it has high conductivity without inducing chemical change in the battery. For example, it may be formed of copper, stainless steel, aluminum, nickel, titanium, calcined carbon, copper or stainless steel surface-treated with carbon, nickel, titanium, silver or the like, an aluminum-cadmium alloy, or the like can be used. In addition, similarly to the positive electrode current collector, fine unevenness may be formed on the surface to enhance the adhesive force of the negative electrode active material, and it may be used in various forms such as a film, a sheet, a foil, a net, a porous body, a foam, and a nonwoven fabric.

The negative electrode active material may include, for example, carbon and graphite materials such as natural graphite, artificial graphite, expanded graphite, carbon fiber, non-graphitized carbon, carbon black, carbon nanotube, fullerene and activated carbon; metals such as Al, Si, Sn, Ag, Bi, Mg, Zn, In, Ge, Pb, Pd, Pt, Ti or the like that can be alloyed with lithium, and compounds containing these elements; complexes of metals and their compounds with carbon and graphite materials; lithium-containing nitrides, and the like. Among them, a carbon-based active material, a silicon-based active material, a tin-based active material, or a silicon-carbon based active material is more preferable, and these may be used alone or in combination of two or more.

The separator is interposed between the positive electrode and the negative electrode, and an insulating thin film having high ion permeability and mechanical strength is used as the separator. The separator typically has a pore diameter of 0.01 to 10 µm and a thickness of 5 to 300 µm. As the separator, sheets or non-woven fabrics made of an olefin-based polymer such as polypropylene, glass fibers or polyethylene, which have chemical resistance and hydrophobicity, are used. When a solid electrolyte such as a polymer is used as the electrolyte, the solid electrolyte may also serve as both the separator and electrolyte.

The lithium salt-containing non-aqueous electrolyte is composed of a non-aqueous electrolyte and a lithium salt. The non-aqueous electrolyte that can be used includes a non-aqueous electrolyte solution, an organic solid electrolyte, an inorganic solid electrolyte, and the like. Examples of the non-aqueous organic solvent may include an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfranc, 2-methyltetrahydrofuran, dimethylsulfoxide, 1,3-dioxolane, formamide, dimethylformamide, dioxolane, acetonitrile, nitromethane, methyl formate, methyl acetate, triester phosphate, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate, ethyl propionate and the like. Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, polymers containing ionic dissociation groups, and the like.

Examples of the inorganic solid electrolyte include nitrides, halides, sulfates or the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt is a substance that is readily soluble in the non-aqueous electrolyte, and example thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, imide and the like.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, and it may further include FEC(fluoroethylene carbonate), PRS(propene sultone), FPC(fluoropropylene carbonate), or the like.

The present invention also provides a battery pack including a lithium secondary battery.

Since the structure and manufacturing method of such a battery pack are well known in the art, a detailed description thereof will be omitted herein.

The battery pack may be included as a power source of a mobile device which requires a high capacity, excellent output characteristics, and battery safety.

Specifically, the device may be selected from the group consisting of, for example, a mobile phone, a portable computer, a wearable electronic device, a tablet PC, a smart pad, a netbook, and a smart watch.

Since the structure and manufacturing method of such a device are well known in the art, a detailed description thereof will be omitted herein.

DETAILED DESCRIPTION OF THE EMBODIMENTS

Now, the present invention will be described in more detail with reference to the following examples, comparative examples and experimental example, but the scope of the present invention is not limited thereto.

EXAMPLE 1

(Production of Precursor for Production of Positive Electrode Active Material)

In order to produce a precursor for the production of a positive electrode active material for a secondary battery, first, 2 L of distilled water was filled in a 3 L wet-type reactor tank, and then nitrogen gas was continuously injected into the tank at a rate of 1 L/min to remove dissolved oxygen. At this time, the temperature of the distilled water in the tank was maintained at 45 to 50° C. by using a temperature maintaining device. Further, the distilled water in the tank was stirred with speeds in the range of 1000-1200 rpm using an impeller connected to a motor installed outside the tank.

Nickel sulfate, manganese sulfate, and cobalt sulfate were mixed at a ratio (molar ratio) of 0.55:0.25:0.2 to prepare a 1.5M transition metal aqueous solution. In addition, a 3M sodium hydroxide aqueous solution was also prepared. The transition metal aqueous solution was added at a rate of 0.3 L/hr to a wet-type reactor maintained at 45 to 50° C. and containing distilled water, and then a transition metal aqueous solution, a doping agent containing $PO_4$, and a salt containing zirconium (Zr) as a doping element were added. The prepared sodium hydroxide aqueous solution was added so that the distilled water in the wet-type reactor was maintained at a pH of 11.0 to 12.5. A 30% ammonia solution as an additive was continuously to the wet-type reactor at a rate of 0.035 L to 0.04 L/hr. The mixture was stirred using an impeller speed of 1100 rpm, and then the transition metal aqueous solution, the sodium hydroxide aqueous solution and the ammonia solution were added by adjusting their flow rates such that the average residence time of the solutions in the wet-type reactor was about 5 hours. After the reaction in the reactor arrived at a steady state, a certain duration of time was given to obtain an oxide with a higher density. Then, transition metal hydroxide $(Ni_{0.55}Mn_{0.3}Co_{0.1}Zr_{0.05}[(OH_{0.53})_{1.95}(PO_4)_{(0.15/3)}])$ was synthesized.

To the transition metal hydroxide $(Ni_{0.55}Mn_{0.3}Co_{0.1}Zr_{0.05}[(OH_{0.53})_{1.95}(PO_4)_{(0.15/3)}])$ synthesized in the wet-type reactor, a 2M transition metal aqueous solution containing cobalt sulfate, a doping agent containing $PO_4$, a salt containing zirconium(Zr) as a doping element were added, and then a sodium hydroxide aqueous solution and an ammonia solution were added by adjusting their flow rates such that the average residence time of the solutions in the wet-type reactor was about 2 hours. At this time, the supply of gas was replaced by nitrogen gas to make a reducing atmosphere. A 4M sodium hydroxide solution was added so as to maintain at a pH of 11. After the arrival of a steady state, a certain duration of time was given to obtain an oxide with high density. Subsequently, a shell layer composed of transition metal hydroxide $(Co_{0.95}Zr_{0.05}[(OH_{0.53})_{1.95}(PO_4)_{(0.15/3)}])$ was formed on the core composed of $Ni_{0.55}Mn_{0.3}Co_{0.1}Zr_{0.05}[(OH_{0.53})_{1.95}(PO_4)_{(0.15/3)}]$ to obtain a precursor having a core-shell structure.

(Production of Positive Electrode Active Material)

The precursor obtained by the reactor was washed with distilled water, filtered, and dried in a constant temperature drier at 120° C. for 24 hours to remove residual moisture. The thus dried precursor having a core-shell structure and $Li_2CO_3$ were mixed at a weight ratio of 1:1, and the mixture was heated at a heating rate of 5° C./min and calcined at 920° C. for 10 hours to obtain a lithium transition metal oxide powder (positive electrode active material). Thereby, the positive electrode active material powder having a core-shell structure in which the core layer of the positive electrode active material was composed of $Li[Ni_{0.55}Mn_{0.3}Co_{0.1}Zr_{0.05}]O_{1.95}(PO_4)_{(0.15/3)}$, and the shell layer was composed of $LiCo_{0.95}Zr_{0.05}O_{1.95}(PO_4)_{(0.15/3)}$ was obtained.

(Production of lithium secondary battery)

The previously prepared positive electrode active material was mixed with a conductive material and a binder (PVdF) at a ratio of 95:2.5:2.5 (weight ratio of active material, conductive material and binder) and the mixture was added to NMP (N-methyl-2-pyrrolidone) as a solvent to prepare a positive electrode mixture slurry. 95 wt % of an artificial graphite as a negative electrode active material, 1.5 wt % of a conductive material (Super-P) and 3.5 wt % of a binder (PVdF) were added to a solvent NMP to prepare a negative electrode mixture slurry. Then, coating, drying and pressing were respectively carried out on the aluminum foil and the copper foil to produce a positive electrode and a negative electrode.

A porous polyethylene separator was interposed between the positive electrode and the negative electrode, and then an electrolytic solution in which 1M $LiPF_6$ was dissolved in a carbonate solvent having EC:EMC=1:2 was injected to produce a coin battery.

EXAMPLE 2

A battery was produced in the same manner as in Example 1, except that a 1.5M transition metal aqueous solution was prepared by mixing nickel sulfate, manganese sulfate, and cobalt sulfate at a ratio (molar ratio) of 0.6:0.2:0.2.

Comparative Example 1

A battery was produced in the same manner as in Example 1, except that a positive electrode active material powder having a structure in which compound particles of $Li[Ni_{0.55}Mn_{0.3}Co_{0.1}Zr_{0.05}]O_{1.95}(PO_4)_{(0.15/3)}$ and compound particles of $LiCo_{0.95}Zr_{0.05}O_{1.95}(PO_4)_{(0.15/3)}$ were uniformly mixed was prepared, instead of preparing a positive electrode active material powder having a core-shell structure.

Comparative Example 2

A battery was produced in the same manner as in Example 1, except that a doping agent containing $PO_4$ for substituting anions for hydroxyl groups of the precursor was not supplied during the preparation of the precursor for producing the positive electrode active material for a secondary battery.

Comparative Example 3

A battery was produced in the same manner as in Example 1, except that a salt containing zirconium (Zr) as a doping element was not supplied during the preparation of the precursor for producing the positive electrode active material for a secondary battery.

Experimental Example 1

Lifespan Characteristics

The coin batteries respectively produced in Examples 1 to 2 and Comparative Examples 1 to 3 were charged and discharged 100 times with a current of 0.5 C in a voltage range of 3.0V to 4.4V to evaluate the lifespan characteristics. The results are shown in Table 1 below.

TABLE 1

| Sample | lifespan characteristic $30^{th}/1^{st}$ discharging capacity (%) |
|---|---|
| Example 1 | 98% |
| Example 2 | 97% |
| Comparative Example 1 | 93% |
| Comparative Example 2 | 92% |
| Comparative Example 3 | 92% |

As shown in Table 1, it was confirmed that the lithium secondary battery using the positive electrode active material of the core-shell structure produced in Examples 1 to 2 according to the present invention exhibited a high capacity maintenance rate as compared with the lithium secondary batteries of Comparative Examples 1 to 3.

Experimental Example 2

High-Speed Charging Characteristics

The coin batteries produced in each of Examples 1 to 2 and Comparative Examples 1 to 3 were charged and discharged with a current of 0.1 C in a voltage range of 3.0V to 4.4V and then charged and discharged with a current of 5.0 C to evaluate high-speed charging characteristics. The results are shown in Table 2 below.

TABLE 2

| Sample | 0.1 C charging capacity (mAh/g) | 5 C charging capacity (mAh/g) | High-speed charging efficiency 5.0 C/0.1 C (%) |
|---|---|---|---|
| Example 1 | 184 | 165 | 90 |
| Example 2 | 186 | 168 | 90 |
| Comparative Example 1 | 184 | 155 | 84 |
| Comparative Example 2 | 185 | 152 | 82 |
| Comparative Example 3 | 181 | 151 | 85 |

As shown in Table 2, it was confirmed that the lithium secondary batteries produced in Examples 1 to 2 according to the present invention exhibited high output characteristics as compared with the lithium secondary batteries of Comparative Examples 1 to 3.

Experimental Example 3

Density Measurement of Precursor

Tab densities of the precursors produced through the respective production processes of Examples 1 to 2 and Comparative Examples 1 to 3 were measured, and the results are shown in Table 3 below.

TABLE 3

| Sample | Tap density (g/cc) |
|---|---|
| Example 1 | 2.7 |
| Example 2 | 2.5 |
| Comparative Example 1 | 1.5 |
| Comparative Example 2 | 1.2 |
| Comparative Example 3 | 2.1 |

As shown in Table 3, it was confirmed that the tap densities of Example 1, Example 2, Comparative Example 1, and Comparative Example 3 all exhibited increased tap densities as compared with the tap density of the precursor of Comparative Example 2 produced without supplying the doping agent containing $PO_4$. Therefore, as the precursors for the production of the positive electrode active material according to the present invention further include anions other than hydroxyl groups, the density thereof was increased, thereby producing precursors having a dense and stable structure, When the positive electrode active materials were produced using these precursors, life characteristics of the battery can be improved.

As described above, the precursor for the production of the positive electrode active material for a secondary battery according to the present invention is formed in a structure including a core composed of transition metal hydroxides including nickel(Ni) and manganese(Mn) and further including anions other than hydroxyl groups(OH), or transition metal hydroxides including nickel(Ni), manganese(Mn) and cobalt(Co) and further including anions other than hydroxyl groups(OH), and a shell composed of transition metal hydroxides including cobalt(Co) and further including anions other than hydroxyl groups(OH), thereby producing a positive electrode active material having improved density of the precursor as compared with the case of not containing anions, and having a structure including a core composed of nickel-rich transition metal oxides and a shell composed of cobalt-rich lithium transition metal oxides, and thus such positive electrode active material can exert only merits of the compounds of each of the core and the shell and thus increase the production yield while exhibiting high capacity and excellent high output characteristics.

Various changes and modifications within the sprit and scope of the invention will become apparent to those skilled in the art from this detailed description.

INDUSTRIAL APPLICABILITY

As described above, when the precursor for the production of the positive electrode active material for a secondary battery according to the present invention is formed in a structure including a core composed of transition metal hydroxides including nickel(Ni) and manganese(Mn) and further including anions other than hydroxyl groups(OH), or transition metal hydroxides including nickel(Ni), manganese(Mn) and cobalt(Co) and further including anions other than hydroxyl groups(OH), and a shell composed of transition metal hydroxides including cobalt(Co) and further including anions other than hydroxyl groups(OH), a positive electrode active material having improved density of the precursor as compared with the case of not containing anions, and having a structure including a core composed of nickel-rich transition metal oxides and a shell composed of cobalt-rich lithium transition metal oxides can be produced, and thus such positive electrode active material can exert only merits of the compounds of each of the core and the shell and thus increase the production yield while exhibiting high capacity and excellent high output characteristics.

What is claimed is:

1. A precursor for the production of a positive electrode active material for a secondary battery comprising:
   a core composed of transition metal hydroxides including nickel(Ni) and manganese(Mn) and further including anions other than hydroxyl groups(OH), or transition metal hydroxides including nickel(Ni), manganese(Mn) and cobalt(Co) and further including anions other than hydroxyl groups(OH); and
   a shell composed of transition metal hydroxides including cobalt(Co) and further including anions other than hydroxyl groups(OH),
   wherein the transition metal hydroxide of the core is a compound represented by the following Formula 1, and the transition metal hydroxide of the shell is a compound represented by the following Formula 2

$$Ni_aMN_bCO_{1-(a+b+c)}M_c[(OH_{1-x})_{2-(z/n)}A_{(z/n)}] \quad (1)$$

wherein $0.55 \leq a \leq 0.9$, $0.05 \leq b \leq 0.5$, $0 \leq c \leq 0.1$, $a+b+c \leq 1$, $0 < x < 0.5$, $0.01 \leq z \leq 0.5$, N is an oxidation number of A;

M is one or more selected from the group consisting of W, B, Zr, Al, Ti, Mg, Cr, and Si; and A is one or more selected from the group consisting of $PO_4$, $BO_2$, $B_4O_7$, $B_3O_5$ and F;

$$Co_{(1-a)}Z_a[(OH_{1-x})_{2-(z/n)}N_{(z/n)}] \quad (2)$$

wherein, $0 \leq a \leq 0.1$, $0 < x < 0.5$, $0.01 \leq z \leq 0.5$, n is an oxidation number of A';

Z is one or more selected from the group consisting of W, B, Zr, Al, Ti, Mg, Cr, and Si; and A' is one or more selected from the group consisting of $PO_4$, $BO_2$, $B_4O_7$, $B_3O_5$ and F.

2. A method for producing a precursor for the production of a positive electrode active material according to claim 1 comprising the steps of:
   (a) preparing a transition metal aqueous solution in which a nickel salt and a manganese salt are mixed or a transition metal aqueous solution in which a nickel salt, a cobalt salt, and a manganese salt are mixed, and a sodium hydroxide aqueous solution, and an ammonia aqueous solution;
   (b) supplying the transition metal aqueous solution and a doping agent for substituting anions for hydroxyl groups of the precursor compound, the sodium hydroxide aqueous solution and the ammonia aqueous solution into a wet-type reactor, followed by mixing and reaction to obtain a spherical precipitate in which anions are substituted for hydroxyl groups; and
   (c) simultaneously injecting the spherical precipitate, the aqueous solution of cobalt-based metal salt, the ammonia aqueous solution, and the sodium hydroxide aqueous solution into a wet-type reactor adjusted to have an inert atmosphere, followed by mixing and reaction to obtain a precipitate of particles having a core-shell structure.

3. The method according to claim 2, wherein, in the step (c), a doping agent is further added to the wet-type reactor such that anions are substituted for the hydroxyl group of the compound forming the shell of the precipitate.

4. The method according to claim 2, wherein, in the step (a), a salt containing a doping element for increasing structural stability is additionally prepared, and in the step (b), a salt containing a doping element, a transition metal aqueous solution, a sodium hydroxide aqueous solution and an ammonia aqueous solution are supplied into the wet-type reactor, followed by mixing and reaction to obtain a spherical precipitate.

5. The method according to claim 4, wherein, in the step (c), the spherical precipitate containing the doping element, the aqueous solution of cobalt-based metal salt, the ammonia aqueous solution, and the sodium hydroxide aqueous solution are simultaneously injected into a reactor adjusted to have an inert atmosphere, followed by mixing and reaction to obtain a precipitate of particles having a core-shell structure.

6. The method according to claim 5, wherein the doping element is one or more elements selected from the group consisting of W, B, Al, Zr, Ti, Mg, Cr, and Si.

7. A positive electrode active material for a lithium secondary battery produced using the precursor for the production of the positive electrode active material according to claim 1.

8. The positive electrode active material according to claim 7, wherein an inorganic material layer is additionally formed by coating on the surface of the shell.

9. The positive electrode active material according to claim 8, wherein the inorganic material layer includes at least one inorganic element selected from the group consisting of Al, Ti, Zr, W, Mg, Co, B and Nb.

10. The positive electrode active material according to claim 8, wherein the content of the inorganic material layer is 0.1 wt % or more to 3.0 wt % or less based on the total weight of the positive electrode active material.

11. The positive electrode active material according to claim 7, wherein the content ratio between the core and the shell is from 20:80 to 80:20 on a weight basis.

12. A method for producing a positive electrode active material for a lithium secondary battery comprising the steps of:
 (a) uniformly mixing the precursor for the production of a positive electrode active material according to claim 1 with lithium oxide, and then performing a calcination reaction to produce a lithium transition metal oxide powder.

13. The method according to claim 12, wherein the production method comprises the steps of:
 (b) preparing a mixed solution containing one or more inorganic elements selected from the group consisting of Al, Ti, Zr, W, Mg, Co, B and Nb in an organic solvent;
 (c) mixing the mixed solution with the prepared lithium transition metal oxide powder and stirring the mixed solution in a paste state;
 (d) drying the pasty mixture to evaporate the organic solvent; and
 (e) heat-treating the dried mixture to produce a positive electrode active material in which a mineral layer is formed on the surface of the lithium transition metal oxide particles.

14. A positive electrode comprising the positive electrode active material according to claim 7.

15. A lithium secondary battery comprising the positive electrode according to claim 14.

* * * * *